US009253666B2

(12) United States Patent
Harris et al.

(10) Patent No.: US 9,253,666 B2
(45) Date of Patent: Feb. 2, 2016

(54) SIGNATURE ENABLER FOR MULTI-VENDOR SON COORDINATION

(71) Applicant: Nokia Solutions and Networks Oy, Espoo (FI)

(72) Inventors: John M. Harris, Glenview, IL (US); Anatoly Adrianov, Schaumburg, IL (US); Paul Stephens, Swindon (GB)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/751,615

(22) Filed: Jun. 26, 2015

(65) Prior Publication Data
US 2015/0296393 A1 Oct. 15, 2015

Related U.S. Application Data

(63) Continuation of application No. 13/462,124, filed on May 2, 2012, now Pat. No. 9,078,144.

(51) Int. Cl.
*H04W 88/00* (2009.01)
*H04W 24/02* (2009.01)
(Continued)

(52) U.S. Cl.
CPC ............. *H04W 24/02* (2013.01); *H04W 84/18* (2013.01); *H04W 88/08* (2013.01)

(58) Field of Classification Search
CPC .. H04W 88/00; H04L 29/08108; H04H 60/33
USPC ....................................... 455/507
See application file for complete search history.

(56) References Cited

U.S. PATENT DOCUMENTS

| 6,542,538 | B2 * | 4/2003 | Fischel | H04B 17/309 370/241 |
| 6,947,726 | B2 * | 9/2005 | Rockwell | H04L 29/06 455/411 |
| 6,957,342 | B2 * | 10/2005 | Vatanen | H04W 88/02 380/247 |
| 7,088,959 | B2 * | 8/2006 | Ho | H04W 16/06 455/412.2 |

(Continued)

FOREIGN PATENT DOCUMENTS

| WO | WO-2008/082587 A1 | 7/2008 |
| WO | WO-2009/115554 A1 | 9/2009 |
| WO | WO-2010/126628 A1 | 11/2010 |

OTHER PUBLICATIONS

T-Mobile; "Impact of Self-configuration and self-optimisation functionality on architecture & interfaces"; 3GPP TSG-RAN WG3#53bis; R3-061488; Oct. 10-13, 2006; Seoul, South Korea; whole document (6 pages).

(Continued)

*Primary Examiner* — Hai V Nguyen
(74) *Attorney, Agent, or Firm* — Harrington & Smith

(57) ABSTRACT

A method is disclosed that includes communicating an indication of a signature via one or more links in a wireless network, wherein the signature has been computed by a base station of the wireless network over a plurality of configuration parameters of the base station and identifies at least a portion of a current configuration state of the base station. Another method is disclosed that includes assigning, at a base station in a wireless network, a signature using a context of the base station, wherein the assigning is performed so that the signature identifies at least a portion of a current configuration state of the base station. The method includes sending an indication of the signature to one or more entities in the wireless network. Apparatus and computer program products are also disclosed.

20 Claims, 8 Drawing Sheets

(51) Int. Cl.
*H04W 84/18* (2009.01)
*H04W 88/08* (2009.01)

(56) References Cited

U.S. PATENT DOCUMENTS

| | | | | |
|---|---|---|---|---|
| 7,386,839 B1 * | 6/2008 | Golender | G06F 11/3636 | 717/127 |
| 7,398,305 B2 | 7/2008 | Bodin et al. | | 709/222 |
| 7,551,546 B2 * | 6/2009 | Ma | H04J 11/00 | 370/208 |
| 7,555,569 B1 * | 6/2009 | O'Hare | G06F 3/0611 | 707/999.2 |
| 7,636,717 B1 * | 12/2009 | Gupta | G06F 17/30985 | |
| 7,643,817 B2 * | 1/2010 | Klug | H04L 63/0442 | 455/411 |
| 7,680,497 B2 * | 3/2010 | Soliman | H04W 36/32 | 455/435.1 |
| 7,717,342 B2 * | 5/2010 | Wang | H04W 84/18 | 235/462.01 |
| 7,743,023 B2 * | 6/2010 | Teodosiu | G06F 17/30212 | 707/612 |
| 7,792,206 B2 * | 9/2010 | Ylitalo | H04B 7/0634 | 375/267 |
| 7,835,301 B1 | 11/2010 | Maufer | | 370/254 |
| 7,924,804 B2 * | 4/2011 | Wengerter | H04L 12/5693 | 370/322 |
| RE42,411 E * | 5/2011 | Ayoub | H04W 76/046 | 370/252 |
| 7,937,488 B2 * | 5/2011 | Gondhalekar | H04N 21/23617 | 370/264 |
| 8,024,000 B2 | 9/2011 | Wang et al. | | 455/561 |
| 8,135,811 B2 | 3/2012 | Bodin et al. | | 709/221 |
| 8,139,767 B2 * | 3/2012 | Camenisch | H04L 9/14 | 345/503 |
| 8,185,118 B2 * | 5/2012 | Voyer | H04W 36/0055 | 370/331 |
| 8,223,626 B2 * | 7/2012 | Au | H04L 1/0618 | 370/208 |
| 8,239,506 B2 * | 8/2012 | Danforth | H04L 63/10 | 709/221 |
| 8,256,681 B2 * | 9/2012 | Wang | H04W 84/18 | 235/462.01 |
| 8,326,316 B2 * | 12/2012 | Ogoro | G01S 11/10 | 342/357.29 |
| 8,452,326 B2 * | 5/2013 | Maguire | H04W 28/18 | 455/436 |
| 8,462,705 B2 * | 6/2013 | Kim | H04L 5/001 | 370/328 |
| 8,478,343 B2 * | 7/2013 | Wang | H04W 12/04 | 455/561 |
| 8,496,181 B2 * | 7/2013 | Wang | H04W 84/18 | 235/462.25 |
| 8,503,413 B2 * | 8/2013 | Uemura | H04W 74/0866 | 370/338 |
| 8,542,634 B2 * | 9/2013 | Levkowetz | H04W 8/08 | 370/252 |
| 8,588,089 B2 | 11/2013 | Dottling et al. | | 370/252 |
| 8,723,484 B2 * | 5/2014 | Sun | H01M 10/44 | 320/128 |
| 8,737,998 B2 * | 5/2014 | Siomina | G01S 5/10 | 455/435.1 |
| 8,751,096 B2 * | 6/2014 | Grube | G05B 23/0224 | 701/30.4 |
| 8,755,299 B2 | 6/2014 | Doettling et al. | | 370/252 |
| 8,756,412 B2 * | 6/2014 | Pulini | H04L 63/20 | 370/218 |
| 8,762,958 B2 * | 6/2014 | Golender | G06F 11/3636 | 717/131 |
| 8,774,230 B2 * | 7/2014 | Gheorghiu | H04W 56/0015 | 370/350 |
| 8,780,883 B2 | 7/2014 | Koteeswara et al. | | 370/349 |
| 8,811,208 B2 * | 8/2014 | Johnsson | H04L 41/0833 | 370/252 |
| 8,811,339 B2 * | 8/2014 | Fong | H04W 36/0005 | 370/331 |
| 8,812,691 B2 | 8/2014 | Shi | | 709/228 |
| 8,855,656 B2 * | 10/2014 | Michel | H04W 52/0206 | 455/446 |
| 8,861,343 B2 * | 10/2014 | Yang | H04W 72/1278 | 370/229 |
| 8,861,494 B2 * | 10/2014 | Mukhopadhyay | H04W 4/001 | 370/338 |
| 8,885,504 B2 * | 11/2014 | Xia | H04L 47/122 | 370/252 |
| 8,897,275 B2 * | 11/2014 | Haustein | H04L 5/0032 | 370/328 |
| 8,923,203 B2 * | 12/2014 | Fong | H04J 11/0053 | 370/252 |
| 9,078,144 B2 * | 7/2015 | Harris | H04W 24/02 | |
| 2002/0057340 A1 * | 5/2002 | Fernandez | G08B 13/19608 | 348/143 |
| 2003/0027551 A1 * | 2/2003 | Rockwell | H04L 29/06 | 455/410 |
| 2007/0173259 A1 * | 7/2007 | Akihara | H04W 24/02 | 455/446 |
| 2008/0098467 A1 | 4/2008 | Miller et al. | | 726/5 |
| 2008/0301269 A1 | 12/2008 | Shi | | 709/220 |
| 2009/0046599 A1 | 2/2009 | Pollakowski et al. | | 370/254 |
| 2010/0017074 A1 * | 1/2010 | Verkuilen | E02F 9/265 | 701/50 |
| 2010/0238831 A1 | 9/2010 | Jeong et al. | | 370/252 |
| 2010/0299419 A1 | 11/2010 | Ramankutty et al. | | 709/221 |
| 2010/0323657 A1 * | 12/2010 | Barnard | H04W 4/02 | 455/404.1 |
| 2011/0009105 A1 | 1/2011 | Lee et al. | | 455/418 |
| 2011/0038431 A1 | 2/2011 | Frederiksen et al. | | 375/259 |
| 2011/0086652 A1 | 4/2011 | So et al. | | 455/501 |
| 2011/0096687 A1 | 4/2011 | Dottling et al. | | 370/252 |
| 2011/0105139 A1 | 5/2011 | On | | 455/453 |
| 2011/0182253 A1 | 7/2011 | Shekalim | | 370/329 |
| 2011/0216741 A1 | 9/2011 | Yang et al. | | 370/331 |
| 2011/0230198 A1 | 9/2011 | Phan et al. | | 455/450 |
| 2011/0255514 A1 | 10/2011 | Olofsson et al. | | 370/331 |
| 2011/0268044 A1 | 11/2011 | Yun et al. | | 370/329 |
| 2012/0014308 A1 | 1/2012 | Li et al. | | 370/312 |
| 2012/0044849 A1 | 2/2012 | Farmanbar et al. | | 370/312 |
| 2012/0084415 A1 | 4/2012 | Hu et al. | | 709/221 |
| 2012/0173875 A1 | 7/2012 | Mahidhara et al. | | 713/168 |
| 2012/0208504 A1 | 8/2012 | Song et al. | | 455/411 |
| 2012/0213057 A1 | 8/2012 | Zhang et al. | | 370/216 |
| 2012/0250498 A1 | 10/2012 | Johansson et al. | | 370/221 |
| 2012/0257544 A1 | 10/2012 | Schein et al. | | 370/255 |
| 2012/0257581 A1 | 10/2012 | De | | 370/329 |
| 2012/0258757 A1 | 10/2012 | Qui | | 455/517 |
| 2012/0307697 A1 | 12/2012 | Mukhopadhyay | | 370/311 |
| 2013/0028126 A1 | 1/2013 | Kazmi | | 370/252 |
| 2013/0040683 A1 | 2/2013 | Siomina et al. | | 455/517 |
| 2013/0084884 A1 | 4/2013 | Teyeb et al. | | 455/456.1 |
| 2013/0122910 A1 | 5/2013 | Singh et al. | | 455/437 |
| 2013/0188499 A1 | 7/2013 | Mach et al. | | 370/252 |
| 2013/0188624 A1 | 7/2013 | Lee | | 370/338 |
| 2013/0208699 A1 | 8/2013 | Hakkinen et al. | | 370/331 |
| 2013/0242898 A1 | 9/2013 | Johansson et al. | | 370/329 |
| 2013/0260712 A1 | 10/2013 | Deb et al. | | 455/406 |
| 2013/0260745 A1 | 10/2013 | Johansson et al. | | 455/423 |
| 2013/0272132 A1 | 10/2013 | Heo et al. | | 370/236.2 |
| 2013/0279368 A1 | 10/2013 | Chou et al. | | 370/254 |
| 2013/0286851 A1 | 10/2013 | Moser et al. | | 370/241.1 |
| 2013/0294283 A1 | 11/2013 | Van Phan et al. | | 370/252 |
| 2013/0331079 A1 | 12/2013 | Racz et al. | | 455/418 |
| 2013/0336162 A1 | 12/2013 | Wang et al. | | 370/254 |
| 2014/0026197 A1 | 1/2014 | Tang et al. | | 726/4 |
| 2014/0036786 A1 | 2/2014 | Kazmi et al. | | 370/329 |
| 2014/0040450 A1 | 2/2014 | Sanneck et al. | | 709/223 |
| 2014/0219230 A1 | 8/2014 | Schierl et al. | | 370/329 |
| 2014/0241209 A1 | 8/2014 | Pollakowski et al. | | 370/254 |

OTHER PUBLICATIONS

NTT DOCOMO, et al.; "RAN performance monitoring"; 3GPP TSG RAN WG3#59; Tdoc-R3-080059; Feb. 11-15, 2008; Sorrento, Italy; whole document (4 pages).
"Self-Organizing Network (SON): Introducing the Nokia Siemens Networks SON Suite—an efficient, future-proof platform for SON";

(56) References Cited

OTHER PUBLICATIONS

Downloaded from the Internet on Apr. 23, 2012 whole document (16 pages).
"3rd Generation Partnership Project; Technical Specification Group Services and System Aspects; Telecommunication management; Evolved Universal Terrestrial Radio Access Network (E-UTRAN) Network Resource Model (NRM) Integration Reference Point (IRP); Requirements (Release 10)"; 3GPP TS 32.761 V10.0.0; Dec. 2010; whole document (7 pages).
"3rd Generation Partnership Project; Technical Specification Group Services and System Aspects; Telecommunication management; Evolved Universal Terrestrial Radio Access Network (E-UTRAN) Network Resource Model (NRM) Integration Reference Point (IRP); Information Service (IS) (Release 11)"; 3GPP TS 32.762 V11.1.0; Mar. 2012; whole document (56 pages).
"3rd Generation Partnership Project; Technical Specification Group Services and System Aspects; Telecommunication management; Evolved Universal Terrestrial Radio Access Network (E-UTRAN) Network Resource Model (NRM) Integration Reference Point (IRP); Common Object Request Broker Architecture (CORBA) Solution Set (SS) (Release 9)"; 3GPP TS 32.763 V9.4.0; Oct. 2010; whole document (16 pages).
"3rd Generation Partnership Project; Technical Specification Group Services and System Aspects; Telecommunication management; Evolved Universal Terrestrial Radio Access Network (E-UTRAN) Network Resource Model (NRM) Integration Reference Point (IRP); eXtensible Markup Language (XML) definitions (Release 9)"; 3GPP TS 32.765 V9.4.0; Oct. 2010; whole document (16 pages).
"3rd Generation Partnership Project; Technical Specification Group Services and System Aspects; Telecommunication Management; Self-Organizing Networks (SON) Policy Network Resource Model NRM) Integration Reference Point (IRP); Requirements (Release 10)"; 3GPP TS 32.521 V10.1.0; Dec. 2010; whole document (26 pages).
"3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11)"; 3GPP TS 32.522 V11.1.0; Dec. 2011; whole document (32 pages).
"3rd Generation Partnership Project; Technical Specification Group Services and System Aspects; Telecommunication management; Key Performance Indicators (KPI) for Evolved Universal Terrestrial Radio Access Network (E-UTRAN); Requirements (Release 10)"; 3GPP TS 32.451 V10.0.0; Mar. 2011; whole document (13 pages).
"Upper Layer (Layer 3) Signaling Standard for cdma2000 Spread Spectrum Systems"; 3GPP2 C.S0005-0 Version 1.0; Jul. 1999; whole document (532 pages).

\* cited by examiner

US 9,253,666 B2

SIGNATURE ENABLER FOR MULTI-VENDOR SON COORDINATION

CROSS REFERENCE TO RELATED APPLICATIONS

This application claims priority as a continuation of U.S. application Ser. No. 13/462,124, filed on May 2, 2012 and incorporated herein by reference in its entirety.

TECHNICAL FIELD

This invention relates generally to wireless networks and, more specifically, relates to self-organizing networks.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

The following abbreviations that may be found in the specification and/or the drawing figures are defined as follows:
- 3GPP third Generation Partnership Project
- CPC Computer Program Code
- eNB or eNode B evolved Node B (e.g., an LTE base station)
- ID identification
- KPI Key Performance Indicator
- LTE Long Term Evolution
- NSN Nokia Siemens Networks
- O&M Operations and Maintenance
- NRM Network Resource Model
- SA5 A Standardization Working Group in Telecom Management
- SON Self Optimizing Network
- TS technical standard
- UE User Equipment
- X2 an interface used to communicate between eNBs The self-organizing network, or SON, is a wireless network that attempts to organize itself based on certain criteria. More specifically, the paper by Nokia Siemens Networks (NSN), entitled "Self-Organizing Network (SON): Introducing the Nokia Siemens Networks SON Suite an efficient, future-proof platform for SON", provides the following definition: "In this context, the term self-organizing network is generally taken to mean a cellular network in which the tasks of configuring, operating, and optimizing are largely automated." The NSN paper goes on to state the following: "This breed of network aims to reduce operational expenses while enabling a gratifying user experience even under adverse conditions such as congested traffic."

SON algorithms require a certain amount of time and trial and error (and maybe some degraded user experience during this time) before the algorithms converge after system changes. A number of different explicit indicators of eNB "system changes" can already be shared, e.g., through O&M/SA5 signaling.

However, there are and probably always will be a number of new and different aspects of current eNB configurations which cannot be captured through this existing signaling. For instance, certain configuration parameters of an eNB may be considered by a vendor to be proprietary. SON algorithms do not have access to these proprietary parameters and therefore perform configuration without knowledge of the effects of such parameters.

SUMMARY

This section contains examples of possible implementations and is not meant to be limiting.

In an exemplary embodiment, a method is disclosed that includes communicating an indication of a signature via one or more links in a wireless network, wherein the signature has been computed by a base station of the wireless network over a plurality of configuration parameters of the base station and identifies at least a portion of a current configuration state of the base station.

In another exemplary embodiment, an exemplary apparatus includes one or more processors and one or more memories including computer program code. The one or more memories and the computer program code are configured to, with the one or more processors, cause the apparatus to perform at least the following: communicating an indication of a signature via one or more links in a wireless network, wherein the signature has been computed by a base station of the wireless network over a plurality of configuration parameters of the base station and identifies at least a portion of a current configuration state of the base station.

A further exemplary embodiment is an exemplary computer program product including a computer-readable medium bearing computer program code embodied therein for use with a computer, the computer program code including: code for communicating an indication of a signature via one or more links in a wireless network, wherein the signature has been computed by a base station of the wireless network over a plurality of configuration parameters of the base station and identifies at least a portion of a current configuration state of the base station.

In an additional exemplary embodiment, an apparatus includes means for communicating an indication of a signature via one or more links in a wireless network, wherein the signature has been computed by a base station of the wireless network over a plurality of configuration parameters of the base station and identifies at least a portion of a current configuration state of the base station.

In another exemplary embodiment, a method is disclosed that includes: assigning, at a base station in a wireless network, a signature using a context of the base station, wherein the assigning is performed so that the signature identifies at least a portion of a current configuration state of the base station; and sending an indication of the signature to one or more entities in the wireless network.

An exemplary apparatus includes one or more processors and one or more memories including computer program code. The one or more memories and the computer program code are configured to, with the one or more processors, cause the apparatus to perform at least the following: assigning, at a base station in a wireless network, a signature using a context of the base station, wherein the assigning is performed so that the signature identifies at least a portion of a current configuration state of the base station; and sending an indication of the signature to one or more entities in the wireless network.

An exemplary computer program product includes a computer-readable medium bearing computer program code embodied therein for use with a computer, the computer program code including: assigning, at a base station in a wireless network, a signature using a context of the base station, wherein the assigning is performed so that the signature identifies at least a portion of a current configuration state of the base station; and sending an indication of the signature to one or more entities in the wireless network.

In another exemplary embodiment, an apparatus is disclosed that includes: means for assigning, at a base station in a wireless network, a signature using a context of the base station, wherein the assigning is performed so that the signature identifies at least a portion of a current configuration state of the base station; and means for sending an indication of the signature to one or more entities in the wireless network.

DETAILED DESCRIPTION OF THE DRAWINGS

Figure 1:
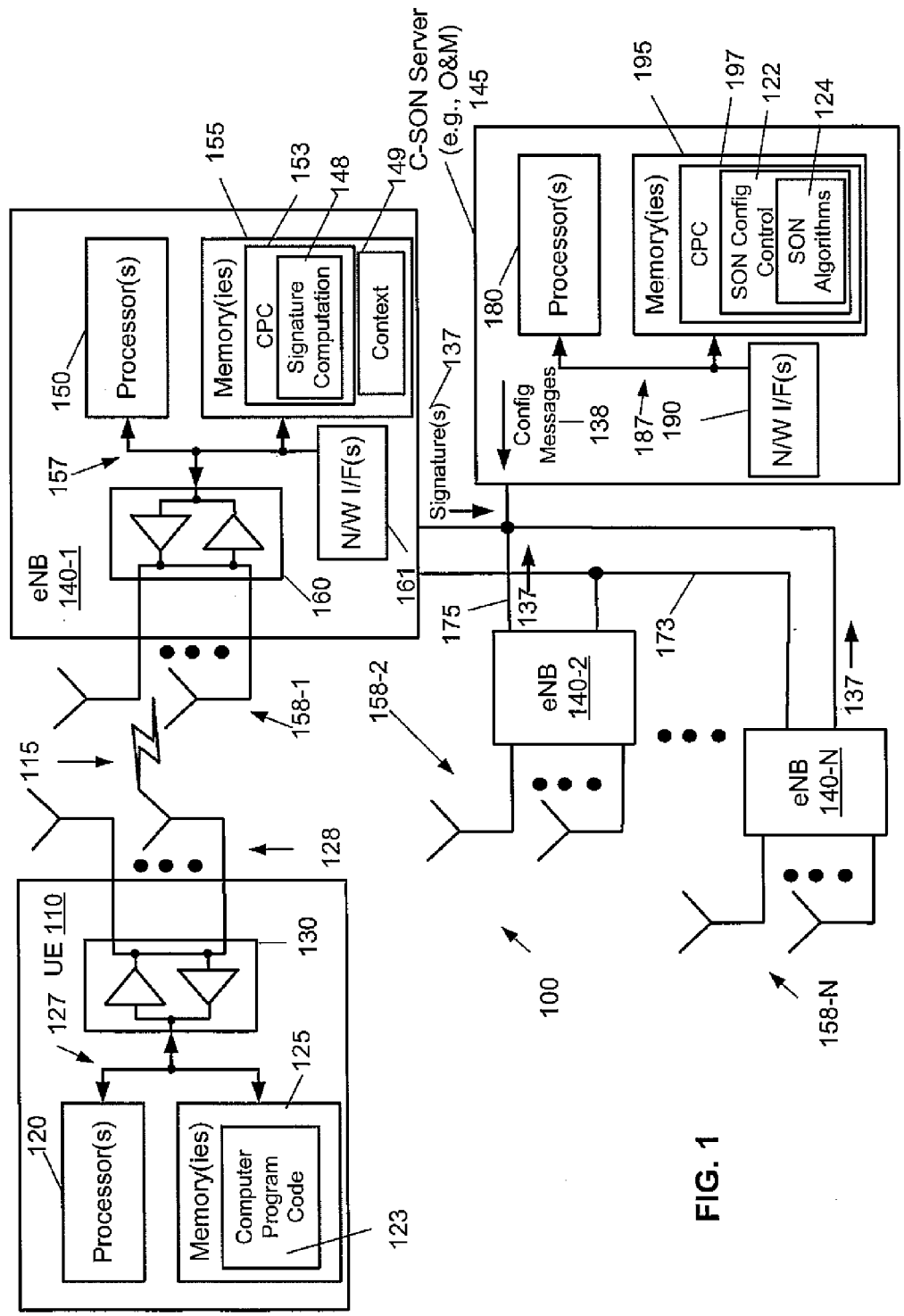
FIG. 1 illustrates an exemplary C-SON system in which the exemplary embodiments of the instant invention may be practiced.

As stated above, there are problems with current SON systems because, e.g., such systems typically do not have access to proprietary parameters set by vendors to configure their cells (e.g., eNBs). These parameters have importance, for example, when loading results caused by changing coverage of an underlay cell. An underlay cell is a smaller cell (e.g., micro, pico, femto cell) having a coverage area partially or completely within the coverage area of a larger cell (e.g., macro cell). In the case where the coverage area of a small cell is reduced due to increased small cell loading for instance, this may make it less appropriate for a UE to directly handoff between adjacent small cells without connecting to the macro cell. This change in coverage may not be reported by the small cell.

As another example, changes in user mobility may occur. This is especially true given the focus/more limited geographic coverage of small cells. The change in user mobility may not be reported by the small cell.

More specifically, in a centralized SON scenario, the C-SON server needs to know a particular node's (e.g., eNB) configuration state. Within the same vendor's system, it is relatively easy to communicate between the node and C-SON server and exchange all configuration parameters. Although this may be expensive, especially in terms of resources consumed, such communication is possible.

Across multiple vendors, it is typically not possible to exchange an entire configuration state snapshot of a cell, since only a subset of the configuration parameters is standardized. The rest of the parameters are vendor-specific and a parameter with the same name may be interpreted or implemented completely differently from vendor to vendor.

Therefore, a mechanism is needed to communicate the node's configuration snapshot to the C-SON server, e.g., without violating current standardization agreements and with minimal standardization.

In a distributed SON scenario, individual nodes need to exchange their configuration snapshots for various SON algorithms to work correctly. There are multiple issues to consider in this scenario. The direct communication between the nodes (e.g., via the X2 interface) has to be minimized. Consequently, a full configuration state exchange is possible, but undesired even between the nodes of the same vendor. Multiple vendor deployment makes this situation more complex, as the exchange could only involve standardized parameters, the NRM has to be expanded similar to the C-SON case, the X2 interface would requires extensions for the exchange, and the like.

These considerations motivate SON algorithms which can consider and exploit such events. Exemplary embodiments herein provide the ability for SON algorithms to consider and exploit such events.

In an exemplary embodiment, signature computation (e.g., a hash function) is computed over an entire configuration state snapshot defined by a vendor, possibly for a specific SON algorithm. The signature computation may involve standardized parameters, plus proprietary parameters identified but not disclosed by the vendor. The resultant signature therefore provides some indication of these proprietary parameters but does not reveal the proprietary parameters.

In inter-vendor scenarios, only the signature is exchanged between a node and a C-SON server and between the nodes. The signature is then used to identify a particular configuration state of a node (e.g., needed for cell outage compensation and the like). That is, should a node go offline (e.g., "die", go into a sleep mode, shutdown), other neighbor nodes can compensate for the lack of the offline cell. In cell outage compensation scenarios, the instant signature mechanism may be used in the following non-limiting and exemplary ways:

Prior to the outage of a node, the neighboring nodes may have optimal states (assume A, B, C) from a SON algorithm perspective, potentially using ICIC (Interference Control Interference Coordination), LBO (load balancing optimization), MRO (mobility robustness optimization), or other algorithms.

After an outage of a node, the neighboring nodes may have to adjust their configurations to compensate for the outage, and in this case their optimal states (from the same SON algorithm perspective) may be different (assume A', B', C')

Once the node is recovered from an outage, the same SON algorithm will have to re-converge back to the original optimal states (A, B, C). To save time, the state signature may be used and instead of slow optimization, nodes may be told to go to the optimal states directly.

However, one interesting scenario which is possible because of the exemplary embodiments of the invention is that when the cell returns from being in an outage, the cell can look at the configuration state of its neighbors and immediately choose a configuration which has worked well in the past given the current configuration of the neighbors. In contrast, in conventional techniques, the cell generally would have reverted to the configuration the cell had just prior to the cell's failing, and the neighbors would have reverted to the configuration which they had just prior to the cell failing. Or previous systems would have used explicit parameters to influence the configuration among the cells. An exemplary embodiment herein, by contrast, enables a more complete sharing of proprietary configuration information based on previous training, rather than relying upon explicit feedback.

Another example could be created where there is no outage per se, but rather one of the cells changes to a new configuration and then the neighboring cells automatically change to some other corresponding configuration which these neighboring cells know works given that the first cell has changed its configuration to its advertised signature.

These examples become more interesting if one considers not only immediate neighbors of a node affected by an outage (or another node changing to a new configuration), but the neighbors of neighbors. Thus, the instant invention may provide large-scale network optimization using a relatively simple signature.

For the same inter-vendor scenarios, the signature may be exchanged between the nodes and may also be communicated vertically to the O&M system. This allows mapping of a configuration profile to the signature computed and stored at the node itself and in the O&M system. Additionally, the signature is communicated horizontally, between the nodes (e.g., over the X2 interface), and a node may then use the signature as a label for the neighbor's configuration state or to retrieve the full configuration state of a neighbor from the O&M system (assuming the node is allowed to receive the neighbor's configuration state).

In an example, the signature is made SON-algorithm-specific, such as computing the signature over different sets of configuration parameters with the actual set of parameters remaining vendor specific. This translates into multiple new signatures, over different parameters, instead of just a single parameter.

Thus, SON configuration control, which may be centralized or distributed, can use the signatures of the nodes in order to determine an overall network configuration (e.g., in the centralized scenario) or to determine a configuration of a node (in the distributed scenario) based on signatures of neighbor nodes. This control occurs without the C-SON server or individual nodes having knowledge of exactly what configuration state the nodes are in. The signature is an indication of the configuration state, but proprietary parameters and, e.g., proprietary SON algorithms need not be revealed.

Figure 3:
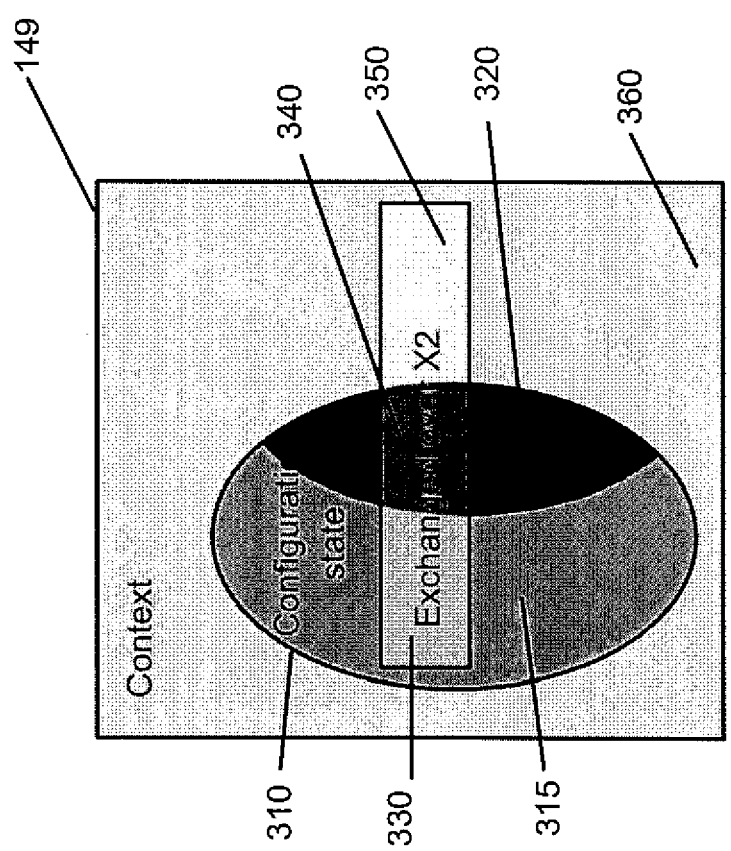
FIG. 3 provides a diagram illustration of context used to determine a signature.

Additional description of the exemplary embodiments occurs after exemplary systems in which the invention may be practiced are described. Turning to FIG. 1, this figure illustrates a block diagram of an C-SON exemplary system in which the instant invention may be practices. In FIG. 1, a user equipment (UE) 110 is in wireless communication through a wireless link 115 with a wireless network 100. Although only one UE is shown in FIG. 3, there could be many UEs 110. The user equipment 110 includes one or more processors 120, one or more memories 125, and one or more transceivers 130 interconnected through one or more buses 127. The one or more transceivers 130 are connected to one or more antennas 128. The one or more memories 125 include computer program code 123. The one or more memories 125 and the computer program code 123 are configured to, with the one or more processors 120, cause the user equipment 110 to perform one or more operations.

The wireless network 100 includes N eNodeBs (eNBs) 140-1 through 140-N and a C-SON server 145. The eNBs 140 are also referred to as nodes herein. The internal elements of eNodeB 140-1 will be described herein, and it is assumed the eNodeBs 140-2 through 140-N are similar. The eNodeB 140-1 includes one or more processors 150, one or more memories 155, one or more network interfaces (N/W I/F(s)) 161, and one or more transceivers 160 interconnected through one or more buses 157. The one or more transceivers 160 are connected to one or more antennas 158. The one or more memories 155 include computer program code (CPC) 153. The one or more memories 155 and the computer program code 153 are configured to, with the one or more processors 150, cause the eNodeB 140 to perform one or more of the operations as described herein. The one or more network interfaces 161 communicate over links such as the links 173, 175.

The C-SON server 145 may be implemented in, e.g., an O&M system. The C-SON server 145 includes one or more processors 180, one or more memories 195, and one or more network interfaces (N/W I/F(s)) 190 interconnected through one or more buses 187. The one or more memories 195 include computer program code (CPC) 197. The one or more memories 195 and the computer program code 197 are configured to, with the one or more processors 180, cause the C-SON server 145 to perform one or more of the operations as described herein. The one or more network interfaces 190 communicate over links such as the links 173, 175.

The eNodeBs 140 communicate using, e.g., link 173. The link 173 may be wired or wireless or both and may implement, e.g., an X2 interface. The C-SON server 145 uses the link 175 to communicate with the eNodeBs 140. The link 175 may be wired or wireless or both and may implement, e.g., a Type 1 or Type 2 interface.

In this example, the one or more memories 155 include a context 149, described in more detail below. The signature computation process 148 in CPC 153 takes a "snapshot" some or all of the context 149 and performs a computation of a signature based on the snapshot. The snapshot is, e.g., a particular instance of some or all of the context 149 at a particular time. It is noted that the computation need not be limited to mathematical computations such as hashing algorithms. Instead, any techniques for assigning a unique signature to some or all of a context may be used. As an example, a high level concept of such assignment may include the following:

A node detects "significant" changes in its context (e.g., a set of configuration parameters in an SA5 embodiment) or a portion thereof in a vendor-specific way;

The node assigns a signature to the context (or portion thereof); and

The signature may be exchanged externally ("disclosed") to identify the context without revealing any specific details/

The context 149 may include (see FIG. 3) the configuration state 310. That is, configuration state 310 is a subset of a context 149. The configuration state 310 in turn contains other subsets: a set 320 of standardized configuration parameters (e.g., attributes), a set 315 of proprietary configuration parameters (e.g., attributes), and, in another dimension, a set 330 of standardized configuration parameters exchanged over inter-vendor (e.g., X2) links (e.g., parameters reaching neighboring eNBs of any vendor), and a set 340 of proprietary configuration parameters exchanged over same vendor (e.g., X2) links (e.g., parameters reaching neighboring eNBs of the same vendor). The context 149 may further include other information 350 exchanged over X2 links and yet additional information 360.

Regarding the terms "parameter" and "attribute", these terms may be synonyms, depending on the context of discussion. For instance, "Configuration parameters" are generally described in high level specifications, whereas "Attributes" are used in the Network Resource Model. One may say that configuration parameters are implemented as attributes (e.g., object attributes). However, for the signature assignment (e.g., calculation) described herein, any difference between the terms "parameter" and "attribute" likely are immaterial, because as long as a state for a particular UE uniquely describes some context (e.g., a configuration state) of the UE, whether "parameters" and/or "attributes" (and/or any other item that helps to define context) are used to assign the signature may not matter.

The context 149 may include (e.g., as part of configuration state 310) primarily configuration information, software information, and hardware state information associated with how the eNB is operating, i.e. including things which are within the scope of the eNB control such as scheduling, handoff decisions, antenna tilt, antennas used, measurement reports, and the like. The context 149 can also include (e.g., in information 360) information about items which the eNB cannot control, but of which the eNB may have knowledge (e.g., by keeping records). This would further be for items falling into this definition which are not always the same. For example, the eNB may have knowledge of the prevailing UE mobility patterns within its coverage area. It may be that a first mobility pattern occurs on Tuesday morning, and then a very different mobility pattern occurs on Tuesday afternoon. Other examples might be UE density/location patterns, i.e., fraction of UEs which are in-building versus outdoors. Another example might relate to the level of foliage or the amount of radio clutter, i.e., there might be more radio clutter when several or many trucks show up to make deliveries and less at other times.

Regarding performing a snapshot assignment (e.g., computation) over the entire configuration state, it may not be necessary to take a snapshot of an entire configuration state. For instance, in an exemplary embodiment, an eNB 140 will have software (e.g., in CPC 153) which will automatically divide the day into several different time intervals or epochs, where each one has its own name or signature. In this type of scenario, the most significant bits of the most key parameters may be used to determine when the cell is in one of the epochs mentioned above versus another, i.e., some configuration changes will be relatively minor and will not result in the cell being transitioned from one epoch to another or from one signature to another.

In contrast, if the assignment is over the entire configuration state, then it may be possible that the only time the signature would ever be seen as a previous signature would be through random chance, not because the cell was in the same high level configuration. This is under the assumption that there are so many parameters that an assignment using a number of bits of precision will appear to have the exact same configuration for two assignments. That is, there is always a probability that an assignment (e.g., using a hash function) could be identical to some other assignment, even though the two assignments are computed over two different inputs.

For these reasons, the assignment may be made based on a portion (less than all) of the context 149. Another example is to weight or emphasize certain parameters over other parameters, so that less influential parameters (e.g., parameters that rarely change) have lower weight and therefore lower input into the signature. As described herein, the assignment of a signature is primarily vendor-specific, and exact algorithms for assigning signatures are not presented here.

Referring back to FIG. 1, the computation creates a signature 137 that the eNB 140-1 sends to the C-SON server 145 via link 175. The signature 137 may be recomputed anytime configuration of the eNB 140-1 changes, such that the context 149 changes or changes by some predetermined amount (e.g., a set number of parameters change). The recomputed signatures 137 are also sent via link 175 to the C-SON server 145. The eNBs 140-2 through 140-N are assumed to operate similarly and also send signature(s) 137 to the C-SON server 145.

The C-SON server 145 includes, in CPC 197, a SON configuration (config) control process 122, which configures the eNBs 140 of network 100 based on the SON algorithms 124. The SON configuration control process 122 examines the corresponding signatures 137, and potentially other information (e.g., cell layout, other information reported by the eNBs 140), and determines how to configure the eNBs 140 of the network 100. The determination may use one or more of the SON algorithms 124. The SON configuration control process 122 creates configuration (config) messages 138 based on the determination and sends configuration messages 138 to the eNBs 140. The eNBs 140 receive the messages and perform any reconfiguration indicated by the configuration messages 138.

Each eNodeB 140 forms a corresponding cell (not shown). It should be noted that operations herein may be described as being performed by a cell. It should be understood that the operations are performed by the corresponding base station, e.g., eNodeB 140. The cells formed may be macro, micro, pico, or femto cells. That is, the cell coverage areas may vary.

The computer readable memories 125, 155 and 195 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 150 and 180 may be of any type suitable to the local technical environment, and may include one or more of general purpose computers, special purpose computers, microprocessors, digital signal processors (DSPs) and processors based on a multi-core processor architecture, as non-limiting examples.

Figure 2:
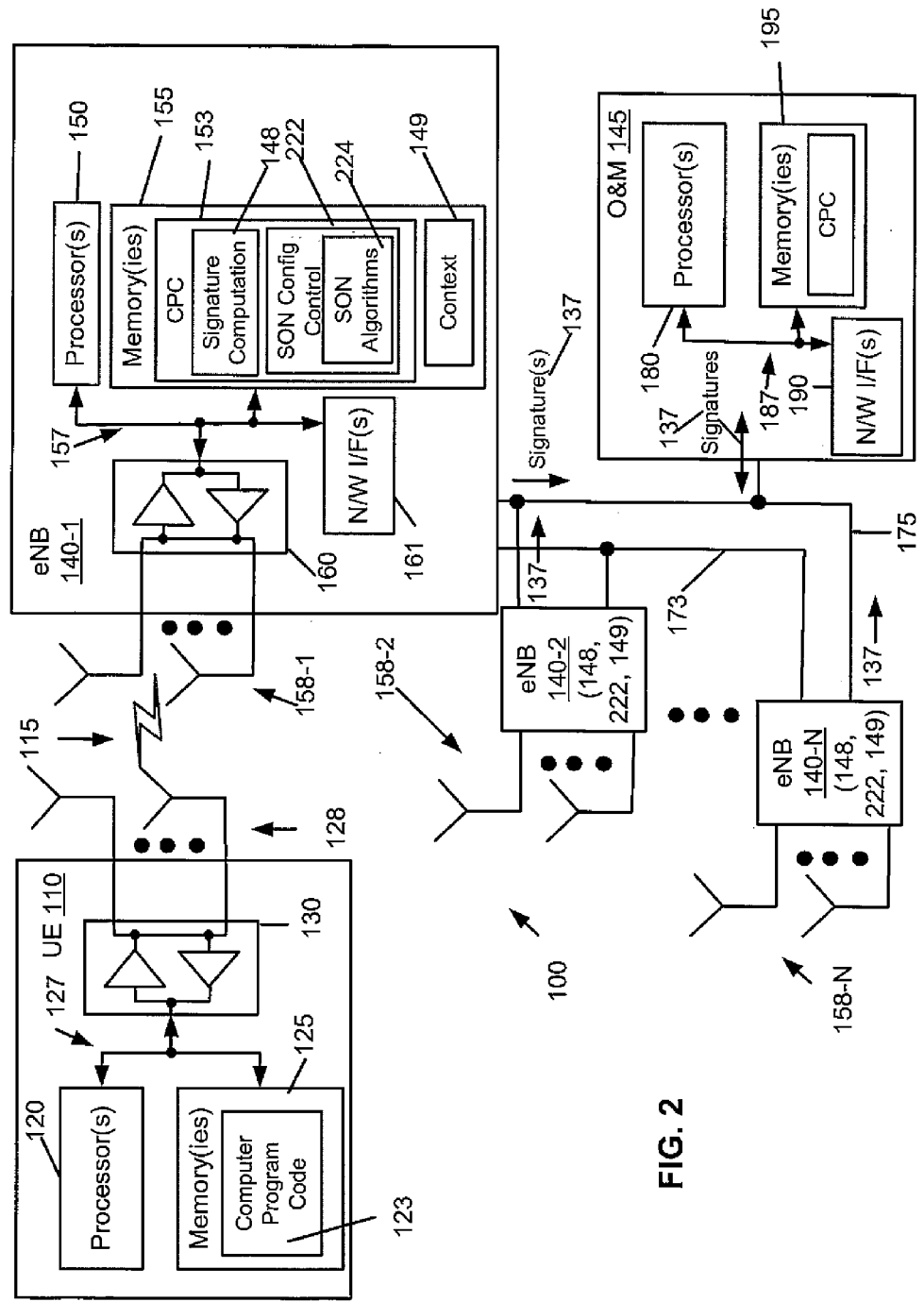
FIG. 2 illustrates an exemplary distributed SON system in which the exemplary embodiments of the instant invention may be practiced.

FIG. 2 illustrates an exemplary distributed SON system in which the exemplary embodiments of the instant invention may be practiced. In this example, the O&M system 145 does not implement SON configuration control, which is now distributed to each of the eNBs. Each of the eNBs therefore includes in this example, the signature computation process 148 (as part of CPC 153), the SON configuration control process 222 (as part of CPC 153), and the context 149 (as part of the one or more memories 155). Each SON configuration control process 222 includes one or more SON algorithms 224.

As with FIG. 1, each of the eNBs 140 determines signature(s) 137 by taking a snapshot of the context 149, as described above and described in more detail below. In the distributed SON system of FIG. 2, each eNB 140 sends its signatures 137 to the O&M system 145 via the link 175 and the O&M system 145 distributes the signatures 137 to the other eNBs 140. Each SON configuration control process 222 controls its corresponding eNB based on signature(s) 137 received from other eNBs 140 and based on its own context 149. Alternatively, the eNBs 140 may communicate the signatures 137 via the link 173. There may also be cases where both links 173, 177 are used, e.g., if one node (an eNB 140) can reach the O&M system 145 via the link 175 but is not connected to a neighbor node 140 via the link 173. For ease of description, it is assumed the N eNBs 140 in FIG. 2 are neighbor nodes.

It is noted that neighbors are those cells that have Neighbor Relations (NR) defined. This is an important aspect of network optimization—a handover could only happen to a "neighbor", e.g., if there is a good candidate cell, the candidate cell will not be used in a "positive" way and may cause interference if the candidate cell is not configured as a neighbor. There is a known SON algorithm, ANR (Automatic Neighbor Relation), that is responsible for establishment and optimization of Neighbor Relations (how to discover neighbors, how to configure them, black lists, white lists, and the like). In LTE, neighbors may have direct X2 signaling links between them, but there could be neighbors without direct links as well.

The signatures 137 may be implemented, e.g., via one or more standards, such as 3GPP TS 32.761 with new requirements for a configuration signature. Further, a change may be made to the 3GPP TS 32.762 adding a new attribute "configurationSignature" to the tables 6.3.25.2 and 6.5.1.1, and corresponding changes to the 3GPP TSs 32.763/32.765. For instance, the "configurationSignature" attribute name in table 6.5.1.1 of 3GPP TS 32.762 could have a definition of "Identifies the current configuration state for the centralized SON. The signature computed over the complete set of configuration parameters relevant to the C-SON function (including those defined in the clause 6.3.25.2 and any vendor specific attributes)". The legal value for the "configurationSignature" attribute could be a string. It is noted that the "complete set of configuration parameters relevant to the C-SON function" may be some but not all of the context 149.

FIGS. 1 and 2 separate SON algorithms into a centralized version (FIG. 1) and a distributed version (FIG. 2). However, this separation may not occur in all systems. In networks, the SON algorithms could be distributed as in FIG. 2 (where nodes communicate directly to each other and optimize themselves), centralized as in FIG. 1 (where nodes report their conditions/measurements to the central "optimizer" node and this node makes optimization decisions for the individual nodes), and hybrid (where optimization decisions are made on different levels).

An eNB without any SON control will not change its own configuration parameters. In some cases, the SON control may be outside of the eNB but in a proprietary Element Manager (EM). The interface between an eNB and an EM is proprietary, whereas the interface between the EM and an NM (Network Manager) is standardized. The standardized interface is known as the "North-Bound interface" or Itf-N. The NM plays the role of IRPManager, and the EM plays the role of IRPAgent. The new attribute ("configurationSignature") described above is to be exchanged over Itf. In an exemplary embodiment, an entity below the Itf-N computes/assigns the signature and reports the over Itf-N to the NM or a C-SON serve. Another possible embodiment is that the signature exchanged between nodes directly over the X2 interface (this supports distributed SON use cases).

Figure 4:
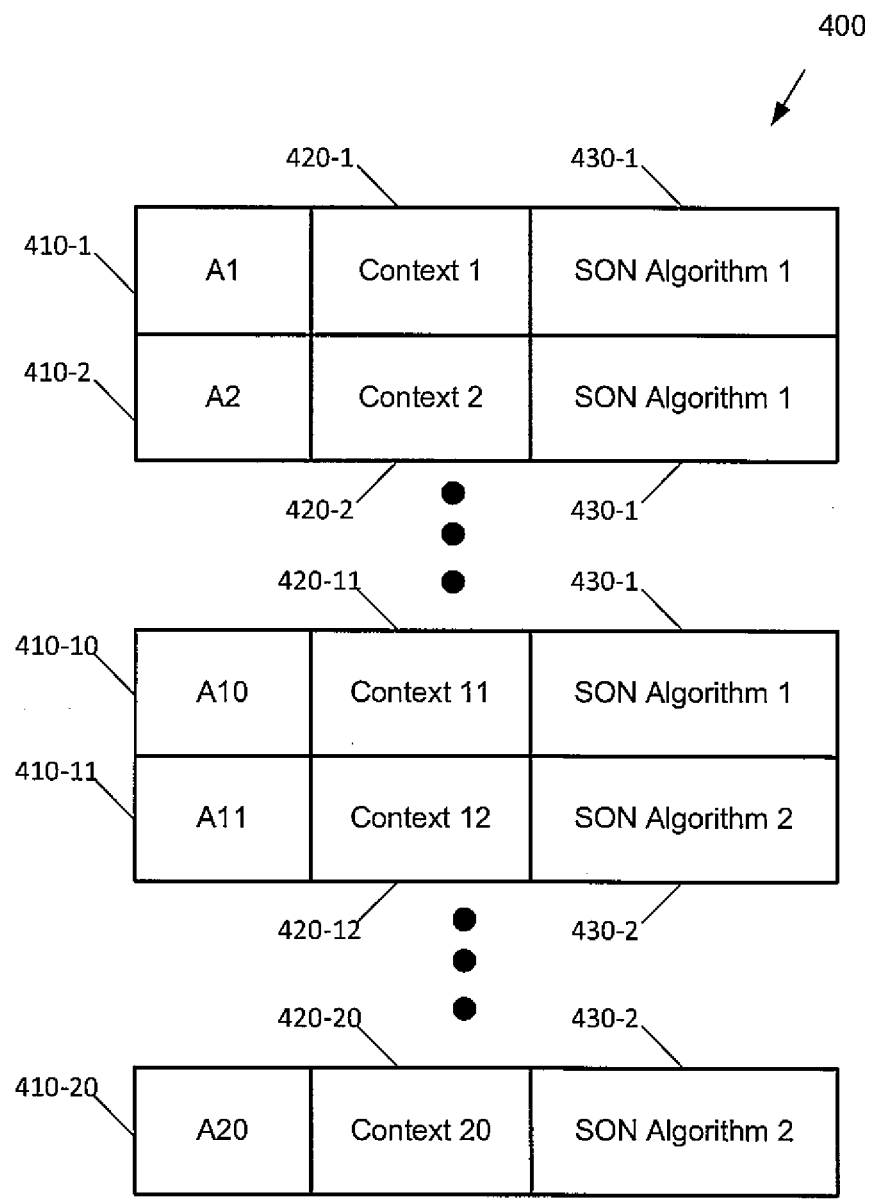
FIG. 4 is an example of a context mapping for multiple signatures, contexts, and SON algorithms.

In FIGS. 1 and 2, it was assumed there is a single context 149. FIG. 4 is an example of a context mapping 400 for multiple signatures 410, contexts 420, and SON algorithm indications 430. In other words, an eNB 140 would build this mapping (e.g., table) 400 in the one or more memories 155 and over some period of time. In this example, there are 20 signatures 410-1 through 410-20, each of which has a corresponding context 420-1 through 420-20. This number is merely exemplary and there may be fewer or more contexts and signatures. Also the signatures may not be alphanumeric.

This example also illustrates an optional correlation with SON algorithm indications 430-1 and 430-2, which are indications of two of the algorithms 224 referenced in FIG. 2. The signatures 410-1 through 410-10 and corresponding contexts 420-1 through 420-10 correspond to SON algorithm indication 430-1 ("SON Algorithm 1") and signatures 410-11 through 410-20 and corresponding contexts 420-11 through 420-20 correspond to SON algorithm indication 430-2 ("SON Algorithm 2"). In this manner, the signatures 410 and contexts 420 may be correlated with SON algorithms 224 (and corresponding indications 430).

Some examples of the techniques associated with the signatures are now described, and then specific examples of flowcharts are described for enabling signatures for multi-vendor SON coordination.

Thus, an exemplary embodiment herein includes a method of providing a signature of current eNB context. An eNB 140 may provide a signature indicating current eNB configuration and therefore associated context up to O&M system 145, C-SON server 145, and/or directly to the neighbor cell(s) (e.g., other eNBs 140).

When an eNB 140 determines that its configuration state has changed, e.g., more than a threshold amount, then the eNB 140 determines whether there is a previous signature that matches the new configuration. If no such signature exists, then a new signature is assigned to the current context 149. The current signature is then transmitted up to O&M system 145, C-SON server 145, and/or used in direct communications between the nodes. The O&M system 145 may then provide the signature 137 down to other neighboring eNBs 140.

Additionally, a signature reset procedure may be performed by each eNB 140, wherein the context (e.g., corresponding to an operating condition based on the context 149) associated with a signature is reset, such that the signature can be used to indicate a new context. That is, if the eNB 140 has a signature indicated by the text "AA", and the eNB 140 would like to reset this signature, the eNB 140 can inform its neighbor eNBs 140 or the C-SON server 145/O&M 145 of the resetting, e.g., through a message indicating the signature of AA is reset. Resetting might be useful, e.g., if the eNB 140 no longer uses the signature 149. More specifically, a signature reset procedure can include an explicit indication that an indicates this is the first time for that particular signature. Thus, the C-SON server 145 or nodes 140 can determine a particular signal-context pair is new, where the context in this instance is the C-SON server's 145 or node's 140 context, as seen by that entity, for the node performing the signature reset procedure. In other words, the C-SON server 145 or nodes 140 gather information about the context of nodes based on corresponding signatures. The C-SON server 145 or nodes 140 therefore develop a signature-context pair, and the signature reset procedure provides an indication the signature-context pair should be reset.

As another example, if a signature has not been used for more than a threshold interval of time, the signature is considered reset. This may be performed by one or both of the node determining the signature or by the C-SON server 145 or nodes 140 that have determined context corresponding to the signature.

For sending the signatures, a start time and/or end time may accompany a particular signature. The start time indicates when a node will implement a configuration corresponding to the signature. The end time indicates when a node will cease to implement a configuration corresponding to the signature.

Furthermore, the start time of a context associated with a signature may occur prior to the current time. For instance, it may take some time for the eNB 140 to detect the presence of a new context, and therefore before the eNB 140 determines to advertise the new signature associated with the new context.

In another example, a confidence interval may be utilized. For instance, if a saved configuration for a context already exists, then the SON system compares the current SON settings with those saved for that context and updates a KPI indicating how similar the current and saved SON settings are. If the current and saved SON settings are very similar, then a higher KPIs generated, resulting in a greater bias towards that configuration the next time that context is entered. In another example, a SON algorithm detects when the algorithm has converged (e.g., parameters are not changing, KPIs are stable, and the like) and archives its optimize parameters, labeling these parameters with specific key network configuration information, context, and signature. It should be noted that a set of KPIs is standardized in, e.g., 3GPP TS 32.451 V10.0.0 (2011-03).

In another example, a hash function may be used to avoid exchanging explicit information between nodes or nodes and O&M system 145, where a receiver (e.g., another node or O&M system 145) has previously received that hash and the corresponding explicit information. This example is targeted to information exchange between nodes of the same vendor, where a vendor may define a particular state and then just exchange the state "name" instead of full configuration set for this state. Then, a hash function using the state name could determine the particular state.

Similarly, a standardized signature could be used instead of explicit context descriptions. That is, if a vendor (or multiple vendors) standardizes what context (or part of the context) is meant by a particular signature, then the signature can be used to cause an eNB to transition to the context corresponding to the standardized signature.

Advantages and other exemplary embodiments include the following. One exemplary benefit of the instant techniques is better user experience due to the SON system converging more quickly after each change in system context. For example, given eNBs A, B, and C, if A goes offline for some reason, B and C adjust. When A comes back online, then A can indicate the node is back to its original configuration via an "original" signature (or a specific signature), so B and C can each select a "best" configuration based on at least the signature provided by A. This selection should occur quickly and much faster than in a conventional system without the signatures. As another example, a node shares a new SON configuration with neighbors after another neighbor has a cell outage. This is a cell outage compensation scenario.

Additionally, this improved performance is anticipated to reduce the amount of system performance cost which results each time the system is reconfigured. The signatures and analyses thereof will enable the system 100 to more frequently and flexibly reconfigure itself, obtaining efficiencies in other dimensions (e.g., greater energy savings), because of the shortened SON re-convergence time intervals.

Moreover, only a limited subset of SON related configuration parameters may be standardized. Further, a node may identify the configuration state of a neighbor by the neighbor's signature without knowing the full detail of how the neighbor is configured (sufficient for COC, Cell Outage Compensation). Additionally, a central server may identify the configuration state of node made by a particular vendor without knowing all the proprietary configuration parameters of the node. A node should be able to fall back to a known (e.g., recent) configuration state identified by a signature. For instance, the C-SON server 145 could send a message indicating a command of, e.g., "fall back to configuration profile A" or "fall back to covering for cell X state", and the like.

Additionally, messaging may be used by nodes to indicate splitting of a signature into two or more different signatures, or collapsing multiple signatures into a single signature. If a signature is split into two or more signatures, those two or more signatures have individual contexts associated with each signature. The messaging may include indications that a current signature (e.g., A) has been split into two or more signatures (e.g., B and C). If multiples signatures are collapsed into a single signature, the context associated with the single signature will also be "collapsed" to a new, single context. Furthermore, messaging may include indications that, e.g., current signatures (e.g., B and C) are collapsed into another signature (e.g., A). It is noted that technically a signature A could be split into signatures A and B, and signatures B and C could be collapsed into signature B. However, this may be easier to track if the original signature is or signatures are not used. It is also noted another option is to perform a reset procedure for the original signature(s) and to simply send indication(s) of the new signature(s) when the eNB 140 implements the new signature(s).

There may also be use of vendor identification in messaging to enable signature interpretation. That is, perhaps it can be determined that all nodes from a particular vendor operate in a particular manner corresponding to a certain signature. The O&M 145 (e.g., operating as C-SON server 145) or a node with a SON configuration control process 222 may request a cell enter a particular signature again, or predict when a neighbor cell will enter a particular signature.

Figure 5:
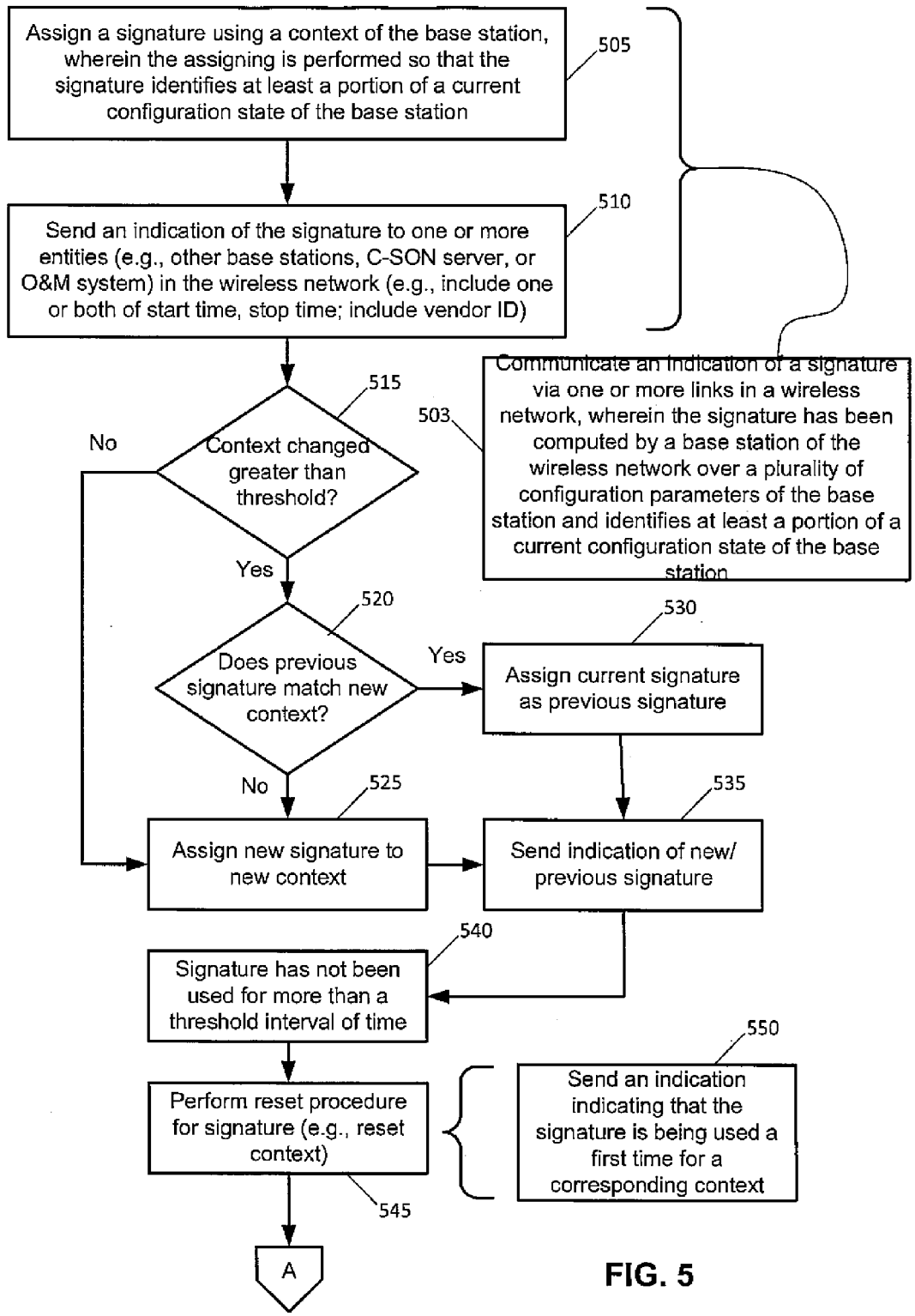
FIG. 5 is a block diagram of a flowchart performed by a base station to provide signatures to enable multi-vendor SON coordination.
Figure 5:
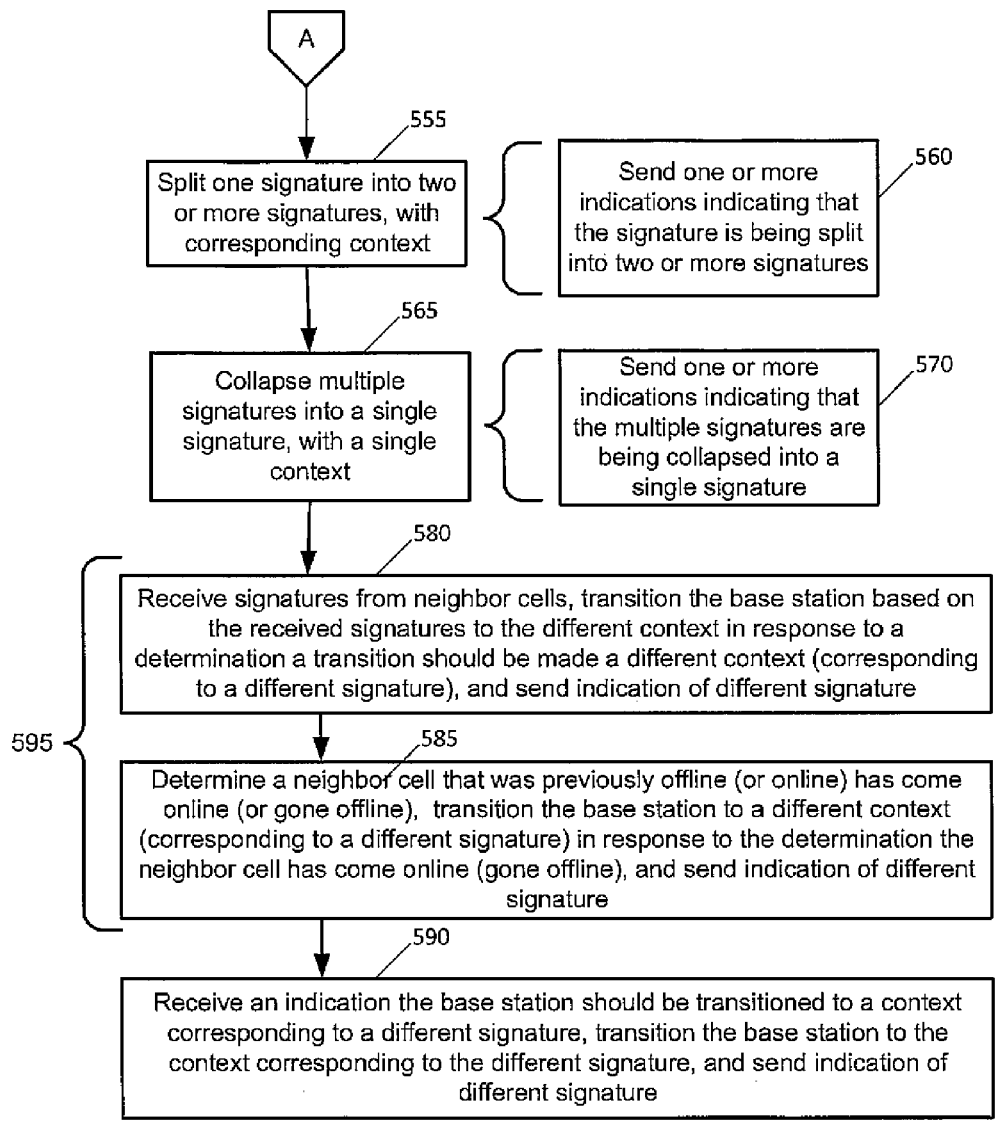

Referring now to FIG. 5, a block diagram is shown of a flowchart performed by a base station to provide signatures to enable multi-vendor SON coordination. Many of the operations are also described above. The base station 140 is typically a node in wireless network 100, and may be an eNB as illustrated by FIGS. 1 and 2. However, the base station may implement radio access technologies other than LTE or LTE-A (LTE-Advanced). The blocks in the block diagram may be method operations, operations performed by a computer program product, or operations performed by hardware (e.g., wherein one or more memories 155 and computer program code 153 are configured, with the one or more processors 150, to cause the base station to perform the blocks, logic such as integrated circuits configured to perform the blocks, or some combination of these).

A communications aspect of an exemplary embodiment is illustrated by block 503, where the base station communicates (e.g., sends) to another base station, an O&M system 145, and/or a C-SON server 145 an indication of a signature via one or more links in a wireless network. As described above, the signature has been computed by a base station of the wireless network over a plurality of configuration parameters of the base station and identifies at least a portion of a current configuration state of the base station. Although it is expected that assignment of a signature is likely to be vendor-specific, some examples are now presented. An assignment could be as simple as identifying a set of, e.g., 10 configuration parameters all related to a particular algorithm (e.g., MRO). Out of these 10, only two are standardized (defined in a NRM). Something like MD5 (a cryptographic hash function) or a CRC (Cyclic Redundancy Check) will be enough to generate a signature for a particular state/configuration snapshot of these 10 parameters. How far each of these 10 parameters have to change to be recognized as a new state is more complex and may be the subject of some sophisticated algorithm (e.g., vendor specific). A new signature (e.g., a value) should identify a distinct state.

In one example, block 503 may be performed by blocks 505 and 510. In block 550, the base station assigns a signature using a context of the base station, wherein the assigning is performed so that the signature identifies at least a portion of a current configuration state of the base station. As described above in reference to FIG. 3, the context 149 may include configuration state parameters 310, in addition to other parameters. In block 510, the base station sends an indication of the signature to one or more entities (e.g., other base stations, C-SON server, or O&M system) in the wireless network. The sending may also include indication(s) of one or both of start time or a stop time and may also include an indication of a vendor ID (i.e., corresponding to the vendor that operates the base station).

In block 515, the base station determines whether context has changed greater than threshold. It is assumed that determining whether context has changed is a determination that will likely be vendor-specific and likely will involve the implementation details of a particular SON (e.g., optimization) algorithm. For this reason, no explicit details of block 515 are presented here. If context has not changed greater than a threshold (block 515=No), the flowchart proceeds to block 525. If context has changed greater than a threshold (block 515=Yes), in block 520 the base station determines (e.g., by accessing context mapping 400, see FIG. 4, in memories 155) if a previous signature matches the new context. If so (block 520=Yes), then in block 530, the base station assigns the current signature as the previous signature. If the previous context does not match the new context (block 520=No), in block 525, the base station assigns a new signature to the new context. Blocks 525 and 530 both proceed to block 535, where the base station signals (e.g., sends) an indication of the new or previous signature.

In block 540, the base station optionally determines whether a signature has not been used for more than a threshold interval of time. If that is the case, then in block 545, the base station performs a reset procedure for the signature. The reset procedure resets context, e.g., so that the signature can be used again for a different context. Block 545 may also be performed for other reasons, such as if the context becomes invalid or another context is determined to have better performance (and therefore the current context might not be used again). Block 545 may be performed via block 550, where the base station send an indication indicating that the signature is being used a first time for a corresponding context. That is, if the base station assigns a new context to the signature and wants to inform other network entities of the new context assignment, the base station can indicate the signature is being used a first time for a "new" corresponding context. Other options are possible, such as the base station sending a message to the network entities that the signature is reset. This latter example might be useful if there is no context to be assigned to the signature, at least within some time window.

In block 555, the base station splits one signature into two or more signatures, with corresponding context. In order to update network entities regarding the splitting, the base station in block 560 sends one or more indications indicating that the signature is being split into two or more signatures. The indications of the original signature and the two or more signatures can be included.

In block 565, the base station collapses multiple signatures into a single signature, with a single context. In order to update network entities regarding the splitting, the base station in block 570 sends one or more indications indicating that the multiple signatures are being collapsed into a single signature. The indications of the original signatures and the single signatures can be included.

In block 580, the base station receives signatures from neighbor cells. The base station may transition the base station to the different context in response to a determination, based on the received signatures, a transition should be made a different context (corresponding to a different signature). The base station can send an indication of the different signature to other network entities.

In block 585, the base station determines a neighbor cell that was previously offline has come online. Block 585 may also be performed as the base station determines a neighbor cell that was previously online has gone offline. The base station may transition itself to a different context (corresponding to a different signature) in response to the determination the neighbor cell has come online (gone offline), and the base station may send indications of the different signature to other network entities.

Block 595 indicates that both blocks 580 and 585 may be combined. For example, assume base station W has neighbor base stations X, Y, and Z. For block 585 by itself, if base station W receives an indication base station Y has gone offline, then receives another indication base station Y has come back online, base station W can transition from one context (corresponding to one signature) to another context (corresponding to a different signature). For the combination of blocks 580 and 585 in the previous scenario, the base station W may transition to another context in response to base station X having a signature of A, newly online base station Y having a signature of B, and base station Z having a signature of C. However, the base station W may not transition to another context in response to base station X having a signature of A, newly online base station Y having a signature of D, and base station Z having a signature of C.

In block 590, the base station receives an indication the base station should be transitioned to a context corresponding to a different signature. For instance, the C-SON server 145 performs signaling indicating the base station should transition to whatever context is associated with signature A. The base station then transition itself to the context corresponding to the different signature, and then sends an indication of the different signature to other network entities (e.g., including or only to the C-SON server 145).

Figure 6:
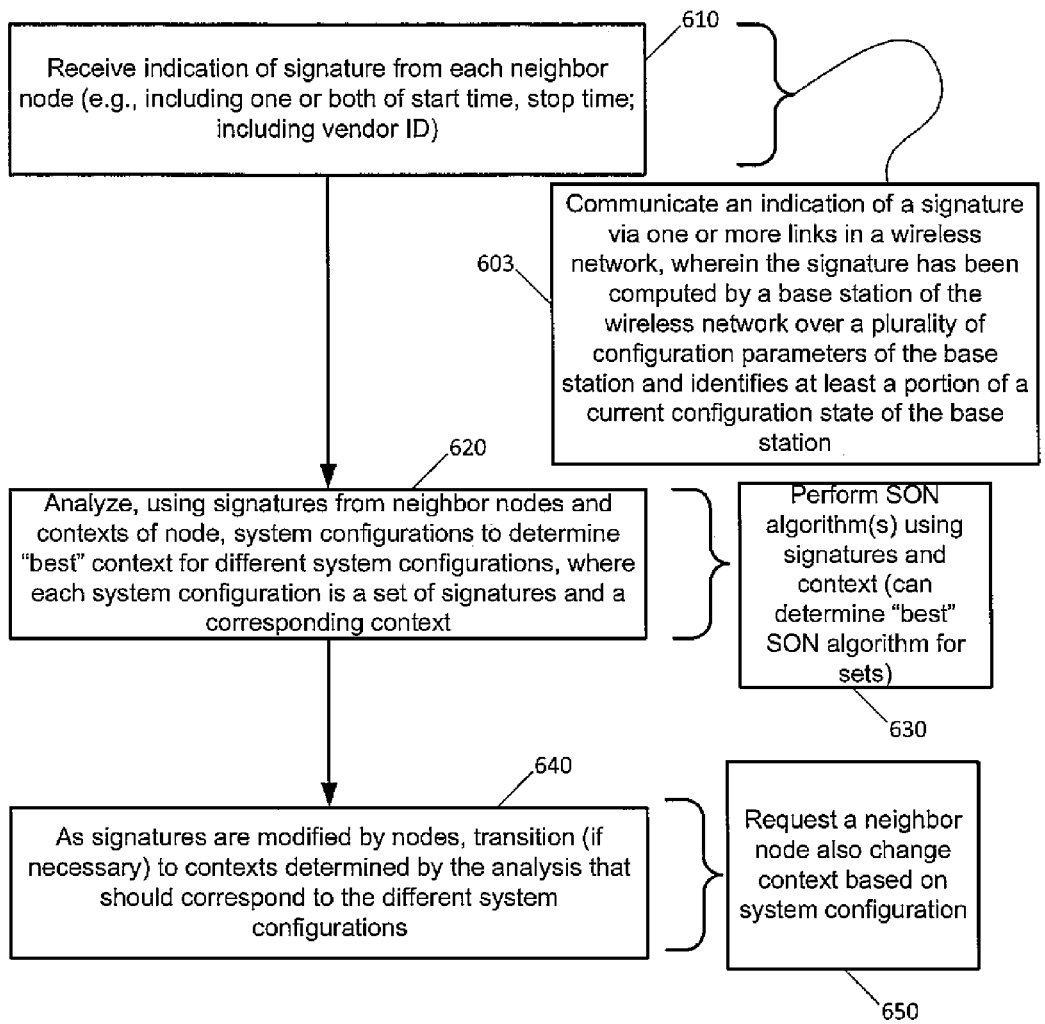
FIG. 6 is a block diagram of a flowchart performed by distributed SON configuration control to use signatures to enable multi-vendor SON coordination.
Figure 7:
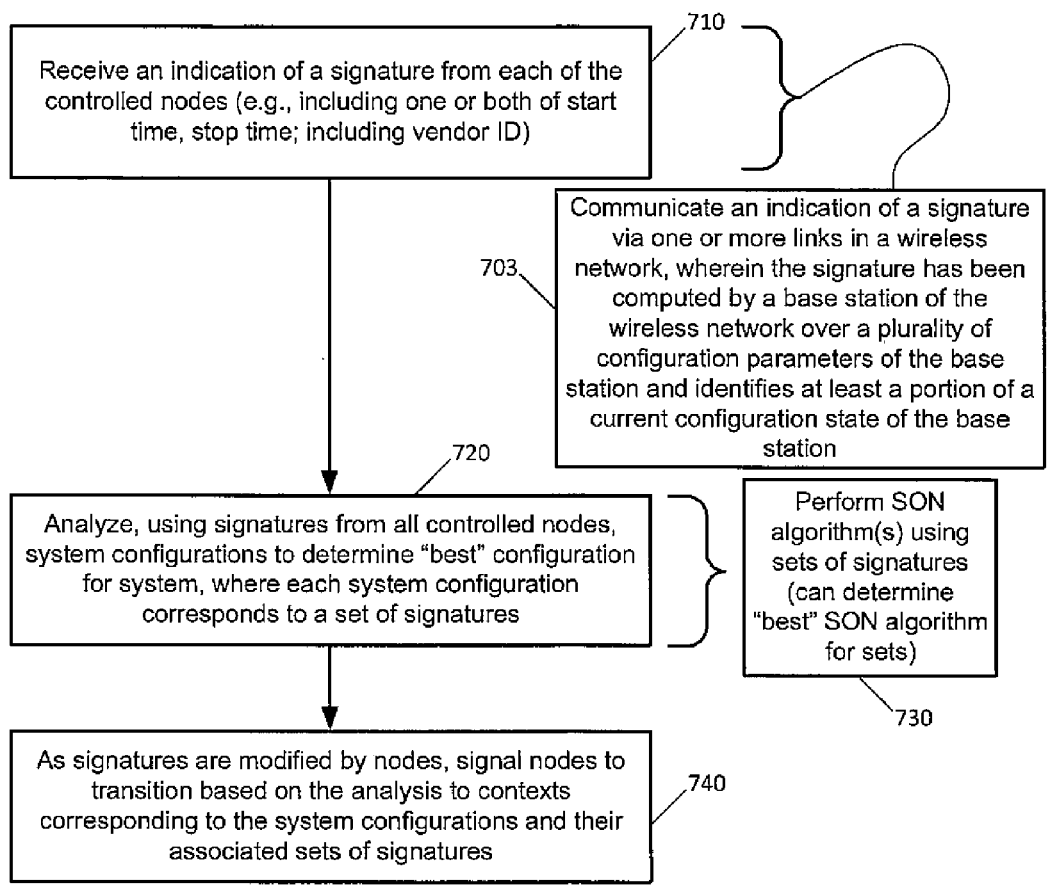
FIG. 7 is a block diagram of a flowchart performed by centralized SON configuration control to use signatures to enable multi-vendor SON coordination.

FIGS. 6 and 7 concern interactions occurring at a SON configuration control, which could be a centralized (FIG. 7) SON configuration control 122 in the C-SON server 145 or a distributed (FIG. 6) version of the SON configuration control 222 implemented on the eNBs 140. FIGS. 6 and 7 are merely to provide a broad overview of possible operations that may be performed. The broad overview is provided instead of a more specific view, for the following reasons. The specific details of a particular SON algorithm are vendor specific. Further, there are many algorithms, such as "cell outage compensation", "mobility robustness optimization", "interference cancellation", and "load balancing", to name some of them. What full set of context attributes is used and how the attributes are evaluated is not standardized. The bare minimum (e.g., required for any vendor's implementation) is standardized, such as load level for load balancing, radio link failure details for MRO (mobility robustness optimization), and the like. For these reasons, FIGS. 6 and 7 only provide an overview.

Turning now to FIG. 6, a block diagram is shown of a flowchart performed by distributed SON configuration control (e.g., 222 of FIG. 2) to use signatures to enable multi-vendor SON coordination. The blocks in the block diagram may be method operations, operations performed by a computer program product, or operations performed by hardware (e.g., wherein one or more memories 155 and computer program code 153 are configured, with the one or more processors 150, to cause the base station to perform the blocks, logic such as integrated circuits configured to perform the blocks, or some combination of these). It is assumed in this example that a base station 140 is performing the blocks, and for ease of reference, the base stations 140 are referred to as nodes.

In block 603, communicating (e.g., receiving) occurs for an indication of a signature via one or more links in a wireless network. As described above, the signature has been computed by a base station of the wireless network over a plurality of configuration parameters of the base station and identifies at least a portion of a current configuration state of the base station. Block 603 includes, in an exemplary embodiment, the base station in block 610 receiving an indication of a signature (e.g., including one or both of start time, stop time and possibly including vendor ID) from each neighbor node. Block 610 includes receiving signatures from all neighbor nodes, that is, nodes that are neighbors to the node performing the blocks in FIG. 6. As noted above, the signatures can be assigned based on contexts of the corresponding nodes.

In block 620, the node analyzes, using signatures from neighbor nodes and contexts of the node, system configurations to determine a "best" context for different system configurations. This analysis may be performed over a long time period, e.g., days, weeks, months, or years. Each system configuration is a set of signatures and a corresponding context. Block 620 may also be performed by performing (block 630) SON algorithm(s) using signatures and context. That is, in an example, block 630 can determine "best" SON algorithm for sets of signatures from neighbor nodes and corresponding context of the node.

In block 640, as signatures are modified by nodes, the node transitions to contexts determined by the analysis that should correspond to the different system configurations. For example if the node is base station W and the base station W determines neighbor base station Y has a signature of B, and neighbor base station Z has a signature of C, the base station W can determine via the analysis in block 620 that the base station should be in context A. If the base station W is not currently in context A, the base station W can transition to context A (block 640).

Additionally, as block 650 illustrates, the node can request a neighbor node also change context based on system configuration. Based on the previous example, if neighbor base station Z has a signature of D (e.g., is in an energy savings state), the base station W can determine the sets of signatures should be B (for base station Y) and C (for base station Z) and context A (for base station W), and base station W can request base station Z to transition (from the context associated with signature D) to the context associated with signature C.

Referring to FIG. 7, a block diagram is shown of a flowchart performed by centralized SON configuration control (e.g., 122 in C-SON server 145) to use signatures to enable multi-vendor SON coordination. The blocks in the block diagram may be method operations, operations performed by a computer program product, or operations performed by hardware (e.g., wherein one or more memories 195 and computer program code 197 are configured, with the one or more processors 180, to cause the server 145 to perform the blocks, logic such as integrated circuits configured to perform the blocks, or some combination of these). It is assumed herein that the blocks in FIG. 7 are performed by the C-SON server 145, but this is merely exemplary.

In block 703, the C-SON server 145 performs communicating (e.g., receiving) an indication of a signature via one or more links in a wireless network. The signature has been computed by a base station of the wireless network over a plurality of configuration parameters of the base station and identifies at least a portion of a current configuration state of the base station. An example of block 703 is performed by block 710, where the C-SON server 145 receives an indication. of a signature from each of the controlled nodes. The reception may include one or both of start time or stop time and may include vendor ID. In block 720, the C-SON server 145 analyzes, using signatures from all controlled nodes, system configurations to determine a "best" configuration for system. Each system configuration corresponds to a set of signatures. This analysis may be performed over a long time period, e.g., days, weeks, months, or years. The analysis may include the C-SON server 145 performing (block 730) SON algorithm(s) using the sets of signatures. Thus, block 730 may determine a "best" SON algorithm for the sets of signatures.

In block 740, as signatures are modified by nodes, the C-SON server 145 signals nodes to transition based on the analysis to contexts corresponding to the system configurations and their associated sets of signatures. Based on the previous example, if base station W has a signature of E (corresponding to context A), base station Y has a signature of B, and base station Z has a signature of D (e.g., is in an energy savings state), the C-SON server 145 W can determine (block 720) the sets of signatures should be D (for base station W), B (for base station Y), and C (for base station Z) (e.g., base station Z should be woken up and in a particular context), and C-SON server 145 can request (block 740) base station Z to transition (from the context associated with signature D) to the context associated with signature C.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIGS. 1 and 2. A computer-readable medium may comprise a computer-readable storage medium (e.g., memory 125, 155, 195 or other device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
   at least one processor;
   memory storing a program of instructions;
   wherein the memory storing the program of instructions is configured to, with the at least one processor, cause the apparatus to at least:
   receive at a network node one or more indications of signatures via links in a wireless network, wherein each of the one or more signatures has been computed by a base station of the wireless network over a plurality of configuration parameters of the base station and identifies at least a portion of a current configuration state of the base station.

2. The apparatus of claim 1, wherein the apparatus is further caused to, upon receiving the one or more indications of signatures, determine if the one or more signatures indicate a configuration change greater than a threshold amount and, upon determination that the one or more signatures indicate a configuration change greater than a threshold amount, transition the network node to a new context.

3. The apparatus of claim 2, wherein the indications of signatures are received from neighboring base stations, and wherein determining of the one or more signatures indicate a configuration change greater than a threshold amount comprises determining if the signatures are updated signatures.

4. The apparatus of claim 2, wherein the apparatus is further caused to, upon transitioning the network node to a new context, assign a new signature to the new context and communicate an indication of the new signature to one or more entities in the wireless network.

5. An apparatus comprising:
at least one processor: memory storing a program of instructions;
wherein the memory storing the program of instructions is configured to, with the at least one processor, cause the apparatus to at least:
assign, at a base station in a wireless network, a signature using a context of the base station, wherein the assigning is performed so that the signature identifies at least a portion of a current configuration state of the first base station; and
control the base station to send an indication of the signature to one or more entities in the wireless network.

6. The apparatus of claim 5, wherein the apparatus is further caused to, in response to a determination by the base station that its context has changed more than a threshold amount to a new context, determine whether a previous signature matches the new context, and wherein, if no such previous signature exists, the assigning further comprises assigning a new signature to the current context, otherwise selecting the previous signature as a current signature, and wherein the sending further comprises sending the new or the previous signature to the one or more entities in the wireless network.

7. The apparatus of claim 5, wherein the context comprises a configuration state of the base station.

8. The apparatus of claim 7, wherein the configuration state further comprises configuration state parameters comprising at least one of proprietary configuration parameters of the base station or standardized configuration parameters received from other entities in the wireless network.

9. The apparatus of claim 5, wherein the apparatus is further caused to perform a signature reset procedure wherein the context associated with the signature is reset so that the signature can be used to indicate a new context.

10. The apparatus of claim 9, wherein sending an indication of the signature further comprises sending an indication indicating that the signature is being used a first time for a corresponding context.

11. The apparatus of claim 9, wherein performing the signature reset procedure is performed responsive to a determination the signature has not been used for more than a threshold interval of time.

12. The apparatus of claim 5, wherein the apparatus is further caused to assign the signature to two or more signatures, each of the two or more signatures corresponding to associated individual contexts of the base station, and sending indications indicating the signature has been split into the two or more signatures.

13. The apparatus of claim 5, wherein there are multiple signatures, and wherein the apparatus is further caused to assign two or more of the multiple signatures into a single signature corresponding to a single context, and sending indications indicating the two or more of the multiple signatures have been collapsed into a single signature.

14. The apparatus of claim 5, wherein the signature is a current signature, and wherein the apparatus is further caused to receive one or more signatures from one or more neighbor cells, determine based on the received one or more signatures and the current signature whether to transition to a different context, transition the base station to the different context in response to a determination that a transition should be made a different context corresponding to a different signature; and send further comprises sending an indication of the different signature to the one or more entities in the wireless network.

15. The apparatus of claim 5, wherein the signature is a current signature and wherein the apparatus is further caused to, in response to determining that a neighbor cell that was previously offline has come online, transition the base station to a different context in response to the determination that the neighbor cell has come online, and wherein sending further comprises sending an indication of the different signature to one or more entities in the wireless network.

16. The apparatus of claim 5, wherein the signature is a current signature and wherein the apparatus is further caused to, in response to receiving an indication the base station should be transitioned to a context corresponding to a different signature, transition the base station to the context corresponding to the different signature in response to tile indication the base station should be transitioned to the context corresponding to the different signature.

17. A non-transitory computer readable medium storing a program of instructions, execution of which by at least one processor configures an apparatus to at least:
assign, at a first base station in a wireless network, a signature using a context of the base station, wherein the assigning is performed so that the signature identifies at least a portion of a current configuration state of the first base station; and
control the first base station to send an indication of the signature to one or more entities in the wireless network.

18. The non-transitory computer readable medium of claim 17, wherein the apparatus is further configured to, in response to a determination by the base station that its context has changed more than a threshold amount to a new context, determine whether a previous signature matches the new context, and wherein, if no such previous signature exists, the assigning further comprises assigning a new signature to the current context, otherwise selecting the previous signature as a current signature, and wherein the sending further comprises sending the new or the previous signature to the one or more entities in the wireless network.

19. The non-transitory computer readable medium of claim 17, wherein the context comprises a configuration state of the base station.

20. The non-transitory computer readable medium of claim 17, wherein the apparatus is further configured to perform a signature reset procedure wherein the context associated with the signature is reset so that the signature can be used to indicate a new context.

* * * * *

UNITED STATES PATENT AND TRADEMARK OFFICE
CERTIFICATE OF CORRECTION

| | | |
|---|---|---|
| PATENT NO. | : 9,253,666 B2 | Page 1 of 1 |
| APPLICATION NO. | : 14/751615 | |
| DATED | : February 2, 2016 | |
| INVENTOR(S) | : Harris et al. | |

It is certified that error appears in the above-identified patent and that said Letters Patent is hereby corrected as shown below:

Claims

Claim 16, col. 18, line 33 "tile" should be deleted and --the-- should be inserted.

Signed and Sealed this
Seventeenth Day of May, 2016

Michelle K. Lee
*Director of the United States Patent and Trademark Office*